US007234147B1

(12) United States Patent
Gharavy et al.

(10) Patent No.: US 7,234,147 B1
(45) Date of Patent: Jun. 19, 2007

(54) METHOD AND APPARATUS FOR SUPPORTING DATA COMMUNICATION BETWEEN PROGRAM COMPONENTS

(75) Inventors: Shari Gharavy, Austin, TX (US); Gabriel Wolosin, San Francisco, CA (US); Brian L. Blount, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 458 days.

(21) Appl. No.: 10/013,850

(22) Filed: Dec. 7, 2001

(51) Int. Cl.
*G06F 13/00* (2006.01)

(52) U.S. Cl. .................. 719/318; 719/310; 719/313

(58) Field of Classification Search ............. 719/310, 719/318, 313
See application file for complete search history.

(56) References Cited

U.S. PATENT DOCUMENTS

| 6,629,128 | B1 * | 9/2003 | Glass .................. 709/203 |
| 6,633,899 | B1 * | 10/2003 | Coward ................ 709/202 |
| 6,643,650 | B1 * | 11/2003 | Slaughter et al. ......... 707/10 |
| 6,654,932 | B1 * | 11/2003 | Bahrs et al. ............. 715/507 |
| 6,782,541 | B1 * | 8/2004 | Cohen et al. ............ 719/318 |
| 6,829,770 | B1 * | 12/2004 | Hinson et al. ........... 719/318 |
| 6,868,543 | B1 * | 3/2005 | Nusbickel .............. 719/318 |
| 2002/0035649 | A1 * | 3/2002 | Korn et al. ............. 709/318 |

OTHER PUBLICATIONS

Kathy Walrath, Mary Compione The JFC Swing Tutorial: "A Guide to Construction GUI's" ISBN # 0201433214. Book & CD Rom- Jul. 1999.
The JFC Swing Tutorial: http://java.sun.com/docs/books/tutorial/uiswing/TOC.html#start Sun Microsystems, Inc. 1995-2002.
The Java Tutorial: User Interfaces that Swing: A Quick Start: Layout Management http//java.sun.com/docs/books/tutorial/uiswing/mini/layout.html Sun Microsystems, Inc. 1995-2002.
The Java Tutorial: Swing Features and Concepts: Layout Management http//java.sun.com/docs/books/tutorial/uiswing/overview/layout.html Sun Microsystems, Inc. 1995-2002.
The Java Tutorial: Creating a GUI with JFC/Swing Lesson, Laying Out Components Within a Container, http//java.sun.com/docs/books/tutorial/uiswing/layout/index.html—Sun Microsystems, Inc. 1885-2002.
George Shepherd and Scot Wingo, MFC and Monikers, http://www.devx.com/premier/mgznarch/vcdj/1997/dec97/moniker1.asp Dec. 1997.
MSDN: Internet Development Index, URL Monikers Tutorial, http://msdn.microsoft.com/workshop/networking/moniker/moniker/asp.?frame=true Microsoft corporation, 2002.

(Continued)

*Primary Examiner*—William Thomson
*Assistant Examiner*—Andy Ho

(57) ABSTRACT

An embodiment of the invention includes a method and apparatus for enabling application components to communicate through connection points. Embodiments of the invention include a communication manger allowing application components that implement connection points and listeners to communicate without having prior knowledge of each other's implementation. Application components implement connection point containers that register with a communication manager. Application components may broadcast events and messages to other components and request to be notified when an application component implementing a given type of connection point registers with the communication manager. Other embodiments of the invention implement proxy classes, which allows for automatic generation of connection point classes.

39 Claims, 11 Drawing Sheets

OTHER PUBLICATIONS

MSDN: URL Monikers: Overview http://msdn.microsoft.com/workshop/networking/moniker/overview/overview.asp. Microsoft Corporation, 2002.

The COM Specification: Persistent Intelligent Names: Monikers, Chapter 11. Monikers (pp. 1-31), http://medg.lcs.mit.edu/ftp/emjordan/com/ch11%2mon.doc 1995, Microsoft Corporation.

Robin Cover: "The XML Cover Pages, XML Schemas" Feb. 19, 2002: oasis-open.org/cover/schemas.html (pp. 1-79).

Editor: James Clark: "W3C" "XSL Transformations (XSLT) Version 1.0" W3C Recommendation Nov. 16, 1999: w3.org/TR/1999/REC-sxlt-19991116 Copyright 1999 W3C. (pp. 1-110).

James Clark (editor), et al. Extensible Stylesheet Language (XSL), Professional XML. Wrox Press, Michael Kay. XLST, Programmer's Regerence. World Wide Web Consortium. 1998- Version 1.0—See w3.org/TR/1998/WD-xsl-19981216.

* cited by examiner

Trilogy Contact Center – RmlMainlet
File  Customer  Product  Order
Navigation | Relationships Current Party: 000000013 - Keva... Current Order: <NO ORDER #>   ~1010

Summary | Details | Addresses | Billing | Notes | Order History

- Customer
  - Search
  - Result
  - Summary>>
  - Details
  - Addresses
  - Billing
  - Notes
  - History
- Product
  - Search
  - Result
- Order
  - View
  - Confirm Home Primary Addresses:

| Type | Street Address | City | State | Zip Code | Country |
|---|---|---|---|---|---|

Table empty

Contact Information:

| | | Notes . |
|---|---|---|
| Full Name | Kevan Thomas Dunsmore | Latest Notes |
| Preferred Name | Kev | |
| Company | Trilogy, Inc. | |
| Title | Purchasing officer | |
| Division | Human Resources | |
| Card Type | American Express | |
| Card Number | | |
| Expiration | | |
| Name on Card | | |

~1040

Create New Order

Order was saved successfully.

METHOD AND APPARATUS FOR SUPPORTING DATA COMMUNICATION BETWEEN PROGRAM COMPONENTS

FIELD OF THE INVENTION

This invention relates to the field of computer software. More specifically, the invention relates to a method and apparatus for supporting connection points for pluggable application components.

BACKGROUND

Modern software applications typically rely on a modularized architecture where several different software modules, built within a common framework, target a well-defined set of functionality. The advantages of such an architecture are numerous. For instance, a modular structure eases the process of code debugging during the development cycle and give developers the ability to add new features to applications requiring minimal alterations to existing code. One common framework applications can be structured around is referred to by those of ordinary skill in the art as a component object framework. A component object framework supports the underlying architecture of the program by using a set of Application Programming Interfaces (API) to support component (i.e. module) development. Examples of component object frameworks are the Component Object Model (COM) from Microsoft Corporation™ and the JAVA™ Standard Development Kit from Sun Microsystems™. In these frameworks, individual components contain a well-circumscribed set of functionality.

In addition, components often need to communicate with one another. For example, a component may access data and manipulate it while a different component is accessing the same data. In this case activities of both components must be coordinated to ensure data integrity. Some components may be specialized in capturing user input and need to notify other components about user events. Yet, other components may be specialized in detecting system events that are of importance to other components. Existing component object frameworks offer, as part of their API supporting component development, a framework (e.g., additional APIs) for inter-component communication.

In Microsoft's COM, a mechanism that supports inter-component communication is known as The Connection Point Mechanism. Connection Points typically provide a mechanism for allowing a first component (e.g. a server) to notify a second component (e.g., a client) of an event for which the client requests a notification, when that event occurs in the server. In component object frameworks, the client typically connects to the server using a common interface, passes to the server requests for specific notification types, and provides information about how the server should notify the client of specific events. In inter-component communication models, the client calls the server with arguments indicating the type of notification requested, and a method in the client interface the server is to call when an event to a specific type is executed. In the component object framework, the method to be called by the server is usually implemented in a separate component called a Listener. A variety of listeners may be implemented by a component to achieve communication with other components.

Swing, a JAVA based component object framework also developed by Sun Microsystems and the Microsoft™ Component Object Model, are both frameworks for developing graphical applications. Both of these object frameworks support an inter-component communication framework. Swing and Java provide an event/communication model that relies on direct communication and direct knowledge between objects in the system. With the Swing model, there are two types of objects: a broadcaster (call it B), and a listener (call it L), and an interface (call it I). For any interface on which the broadcaster is to broadcast an event, the interface implements the methods addIListener and removeIListener. The listener object must implement this interface, and pass it as an argument to the addIListener method on the broadcaster. The Java Swing model requires that the listener know of the broadcaster, and specifically register against it.

Microsoft COM, on the other hand, provides an implementation of The Connection Points Mechanism where the client typically connects to the server using a common interface, passes to the server requests for specific notification types, and provides information about how the server should notify the client of specific events. The intended use of connection points within COM is to allow a host to communicate with a set of components, with the host having knowledge of these components. However, the Swing model and Microsoft COM models both fail to provide a flexible global communication mechanism. Therefore, there is a need for a global communication mechanism that provides components with a flexible way to establish communication links with each other.

DESCRIPTION OF THE DRAWINGS

FIG. 10a is a block diagram illustrating an application implementing an embodiment of the invention.

FIG. 10b is a block diagram illustrating user interaction with an application implementing an embodiment of the invention.

SUMMARY OF THE INVENTION

Figure 1:
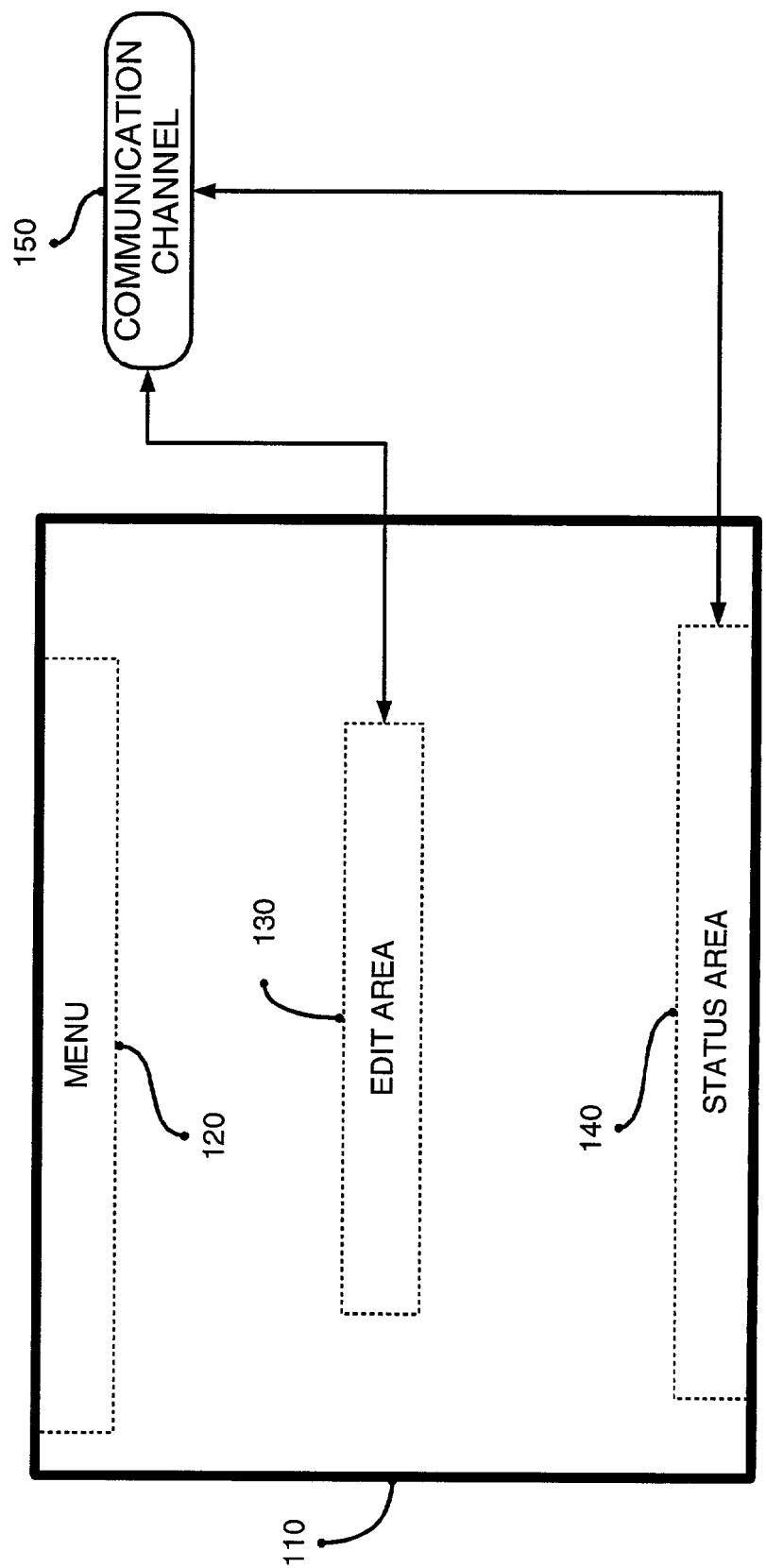
FIG. 1 shows a typical example of components in a GUI application implementing a connection point mechanism for communication between two application components.

The invention includes a method and apparatus for improving communication between disparate software objects. Embodiments of the invention, for example, provide a way for software components added to an application to easily communicate with other existing components. The newly added component listens on a particular channel for different types of information, without having to know what other components belong to the application and without having to specifically listen to those other components. This provides an application program with an additional level of flexibility that greatly increases a developer's ability to build new applications and scale existing applications without knowing all the details of the existing modules in an application.

An embodiment of the invention is written as a computer program comprising a connection point architecture, a global communication manager and a set of helper classes configured to simplify the process of initiating global communication between objects. Proxy classes provide embodiments of the invention with an abstract mechanism that enables communication to occur between disparate objects. These connectable objects each have the ability to handle outgoing interfaces such as event sets and can enumerate the outgoing interfaces. The objects can also connect and disconnect sinks to the object for these outgoing interfaces in addition to having the ability to enumerate the connections that exists to a particular outgoing interface. These components provide computer programs utilizing embodiments of the invention to perform communication through connection points. Such connection points provide a medium for communicating about certain types of events.

In embodiments of the invention application components implement one or more connection points, a connection point container and one or more listeners. The connection point containers register with a communication manager that is enabled to store a registration map and connect connection points to listeners between application components.

To summarize, embodiments of the invention provide a way to efficiently communicate event data between multiple components of a software program.

DETAILED DESCRIPTION

Embodiments of the invention disclose a method and apparatus for supporting connection points. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries. The term element as used herein means any method, function, object, or hardware module configured to perform certain functionality. The term system may include one or more components and may, for example, represent a single computer or a plurality of computer each configured to implement one or more aspects of the invention.

A co-pending application, (Ser. No. 10/013,854), entitled "METHOD AND APPARATUS FOR EFFICIENTLY GENERATING AND MODIFYING USER INTERFACES", having Shari Gharavy and Brian Blount as inventors, and filed on (Dec. 7, 2001) is incorporated herein by reference, describes an example method for supporting pluggable user interface components through the usage of compound components and monikers. Components can be added to an application using monikers to specify the application components and how they should be configured. Embodiments of that invention present a high level of flexibility for building Graphical User Interface based applications. Embodiments of the present invention offer a method and apparatus for efficiently and flexibly managing the inter-component communication in such an environment. For example, in the co-pending application since application components are pluggable they may or may not be available at run-time. An embodiment of the present invention offers a means for enabling components to run independently and communicate with components when they are available or become available in an application. Furthermore, embodiments of the invention enable unrelated components to communicate with each other.

FIG. 1 shows a typical example of the components belonging to a Graphic User Interface (GUI) application implementing a connection point mechanism for communication between two application components. In one embodiment of the invention, application components (e.g., 120, 130 and 140) are contained within compound panel component 110. In this example, component 120 (menu bar) is designed to present a menu from which a user may select an action to be executed by the application, while component 130 (edit bar) is designed for editing a string of text, and component 140 (status bar) is designed for displaying various types of information produced by other application components. The important feature, in this example, is to show a mechanism (e.g., 150) that connects the edit bar with the status bar. In an embodiment of the invention, application components may select a status bar to display information such as a processing progress report, name of the data file being processed and any type of information an application component may communicate to a user. A connection point 150 allows component 130 to display information through the status bar 140. However, a user may elect to include a status bar in an application. In a flexible environment, a pluggable component such as 140 may be part of the application. A mechanism is described herein for enabling components in a flexible application environment to communicate with each other and dynamically broadcast and receive notifications from each other without being linked at development time. What follows describes the details of the mechanism for designing components in a way that enables the components to communicate with each other without being initially designed to rely on each other's design. This is achieved by using a global communication manager that enables embodiments of the invention to have completely unrelated objects communicate with each other without prior knowledge of other application components' existence within the active system.

FIG. 1 shows a typical example of the components belonging to a Graphic User Interface (GUI) application implementing a connection point mechanism for communication between two application components. In one embodiment of the invention, application components (e.g., 102, 130 and 140) are contained within compound panel component 110. In this example, component 120 (menu bar) is designed to present a menu from which a user may select an action to be executed by the application, while component 130 (edit bar) is designed for editing a string of text, and component 140 (status bar) is designed for displaying various types information produced by other application components. The important feature, in this example, is to show a mechanism (e.g., 150) that connects the edit bar with the status bar. In an embodiment of the invention, application components may select a status bar to display information such as a processing progress report, name of the data file being processed and any type of information an application component may communicate to a user. A connection point 150 allows component 130 to display information through the status bar 140. However, a user may elect to include a status bar in an application. In a flexible environment, a pluggable component such as 140 may be part of the application. A mechanism is described herein for enabling components in a flexible application environment to communicate with each other and dynamically broadcast and receive notifications from each other without being linked at development time. What follows describes the details of the mechanism for designing components in a way that enables the components to communicate with each other without being initially designed to rely on each other's design. This is achieved by using a global communication manager that enables embodiments of the invention to have completely unrelated objects communicate with each other without prior knowledge of other application components' existence within the active system.

Figure 2:
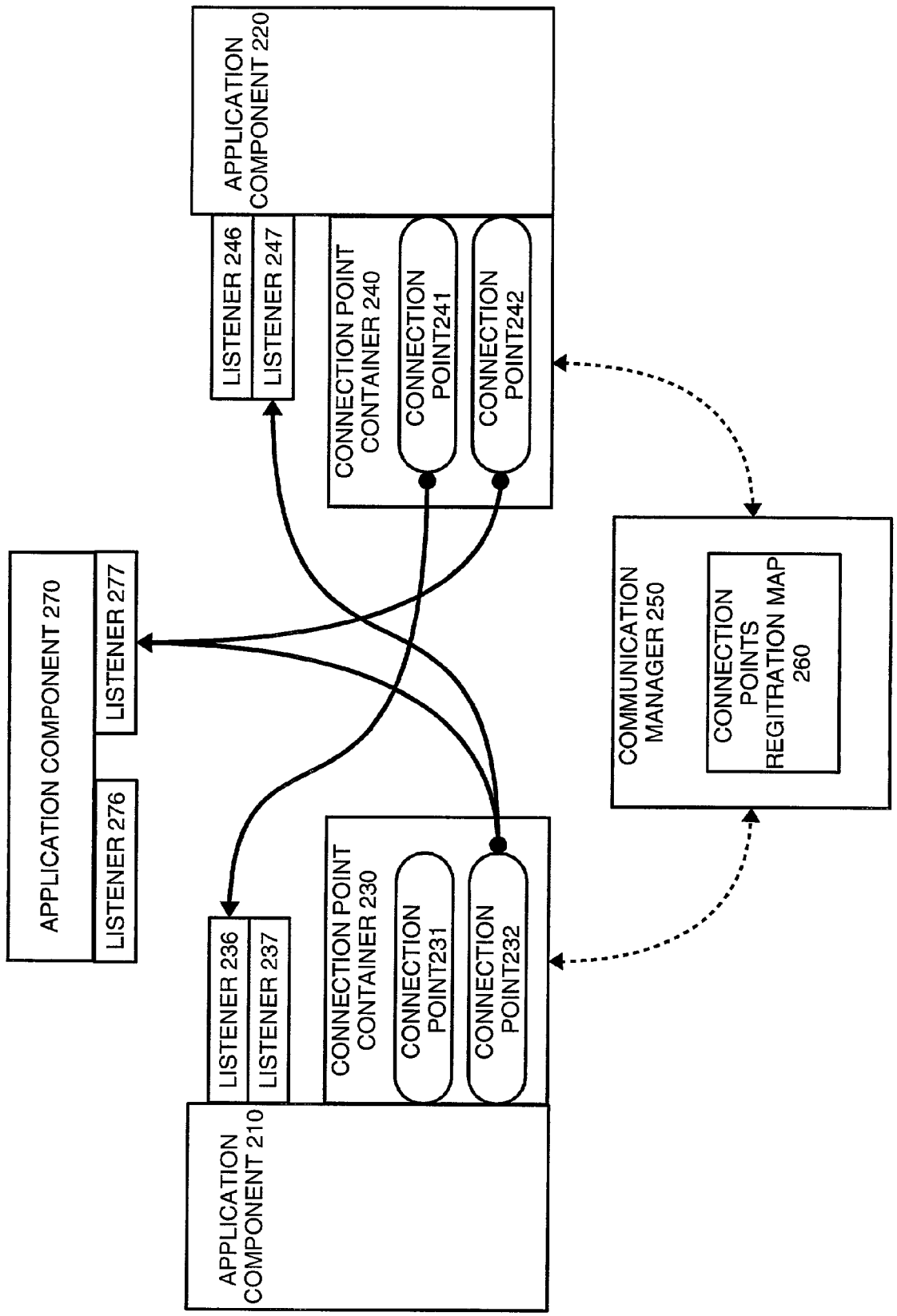
FIG. 2 is a block diagram illustrating the architecture of a system using connection points in accordance with an embodiment of the invention.

FIG. 2 is a block diagram illustrating the system architecture using connection points in accordance with an embodiment of the invention. Application components (e.g., 210, 220 and 270) implement several interfaces for providing the functionality to communicate with each other. An application component is made connectible by implementing outgoing objects interfaces (e.g., event objects and messages), and interfaces that allow objects to connect and disconnect sinks to the object for those outgoing interfaces. Connectable objects also implement interfaces that support the ability to enumerate the outgoing interfaces and the connections that exist to a particular outgoing interface.

Embodiments of the invention include application components that implement connection point classes (e.g., 231, 232, 241 and 242). Connection point classes allow an object to broadcast event messages to other application components. A connection point serves as a channel for conveying a specific type of information to objects that are enabled to receive (or listen) those types of information.

Application components also implement Listener interfaces (e.g., 236, 237, 246, 247, 276 and 277) enabling an application component to receive event messages from other application components. Each Listener is designed to receive a type of event information. A Listener is enabled to inspect event information and determine whether the event information is handled by the application component. FIG. 2 illustrates an example of connections occurring between application components 210, 220 and 270 where connection points 232 and 242 of application components 210 and 220, respectively, broadcast messages on listener 277, whereas connection point 232 broadcast messages onto listeners 277 and 247 of two different application components. FIG. 2 illustrates three application components within an application. However, in accordance with an embodiment of the invention, more application components may be added to the application. Connection points and listeners not connected to other application components, as shown in this example, may be utilized to support communication with newly introduced application components.

In an embodiment of the invention, each application component implements a connection point container (e.g., 230 and 240). A connection point container is an object enabled to enumerate connection points of an application component.

Embodiments of the invention implement a communication manager 250. The communication manager is the central authority that ties together the connection point containers in the system. The communication manager provides the ability to dynamically add and remove connection point containers and components to the system and allows the connection point containers to communicate seamlessly. Connection point containers of the application components register with the communication manager. In embodiments of the invention, the communication manager keeps a registration map 260 (or a record) of all the active connection point containers registered with it. The communication manager provides a mechanism for discovering new connection points for newly registered application components and has a means for notifying previously registered application components about new application components.

In an embodiment of the invention, the communication manager implements a connection point container. The communication manager registers its own connection point container in its map. The communication manager communicates back to other application components because, the application components request from the communication manager to communicate connection point containers that implement the CommunicationManager's broadcast listener interface (ICommunicationManagerEventListener).

Figure 3:
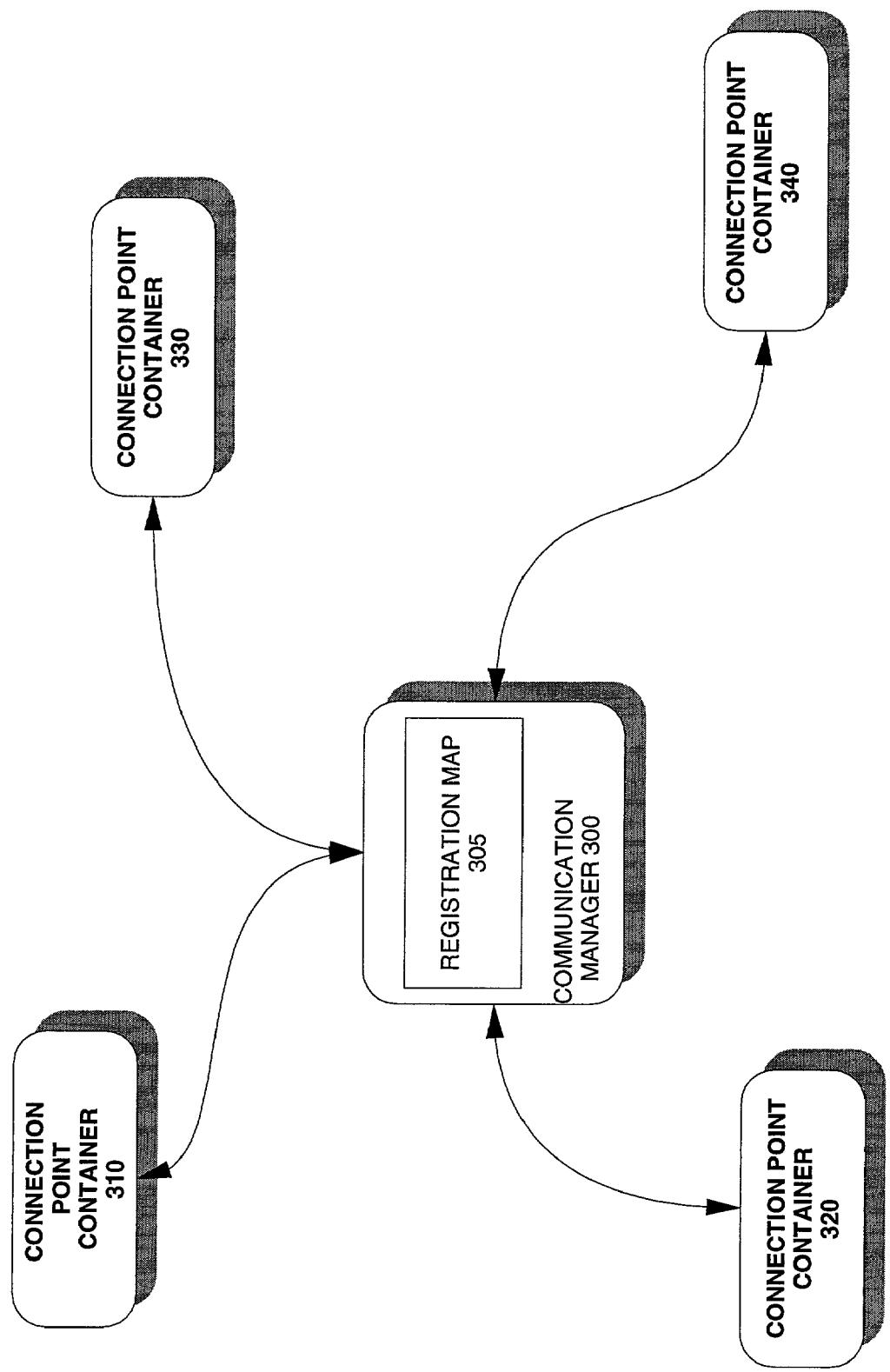
FIG. 3 shows a block diagram illustrating the concept of dynamically linking multiple application components using their connection point containers and a communication manager in an embodiment of the invention.

FIG. 3 shows a block diagram illustrating the concept of dynamically linking multiple application components using their connection point containers and a communication manager in an embodiment of the invention. The bi-directional communication between application component containers (e.g., 310, 320, 330 and 340) and the communication manager 300 illustrates the process of discovery and notification. In an embodiment of the invention, application components register with the communication manager. The communication manager creates an entry in the registration map 305 to their respective connection point container. The discovery process involves placing a request to lookup connection points in all existing application components registered with the communication manager. Embodiments of the invention use a communication manager helper to conduct part of the discovery process. In this process, the communication manager traverses the connection point containers to search for a specific connection point type. Connection points resulting from the search are then linked to the listeners for a specific type.

The communication manager also provides a mechanism through which application components may place a notification request. In this case, a newly registered application component that possess certain connection point types will trigger a notification issued to an application component that placed the request for that type. Typically, the application component that places the notification request implements a listener for a particular type. When an application component implementing a connection point of the corresponding type registers with the communication manager, a notification is triggered. The notification is triggered due to the fact that the communication manager implements connection points. The result of such notification is linking the connection point of the newly registered application component with a listener of the application component requesting the notification.

Figure 4:
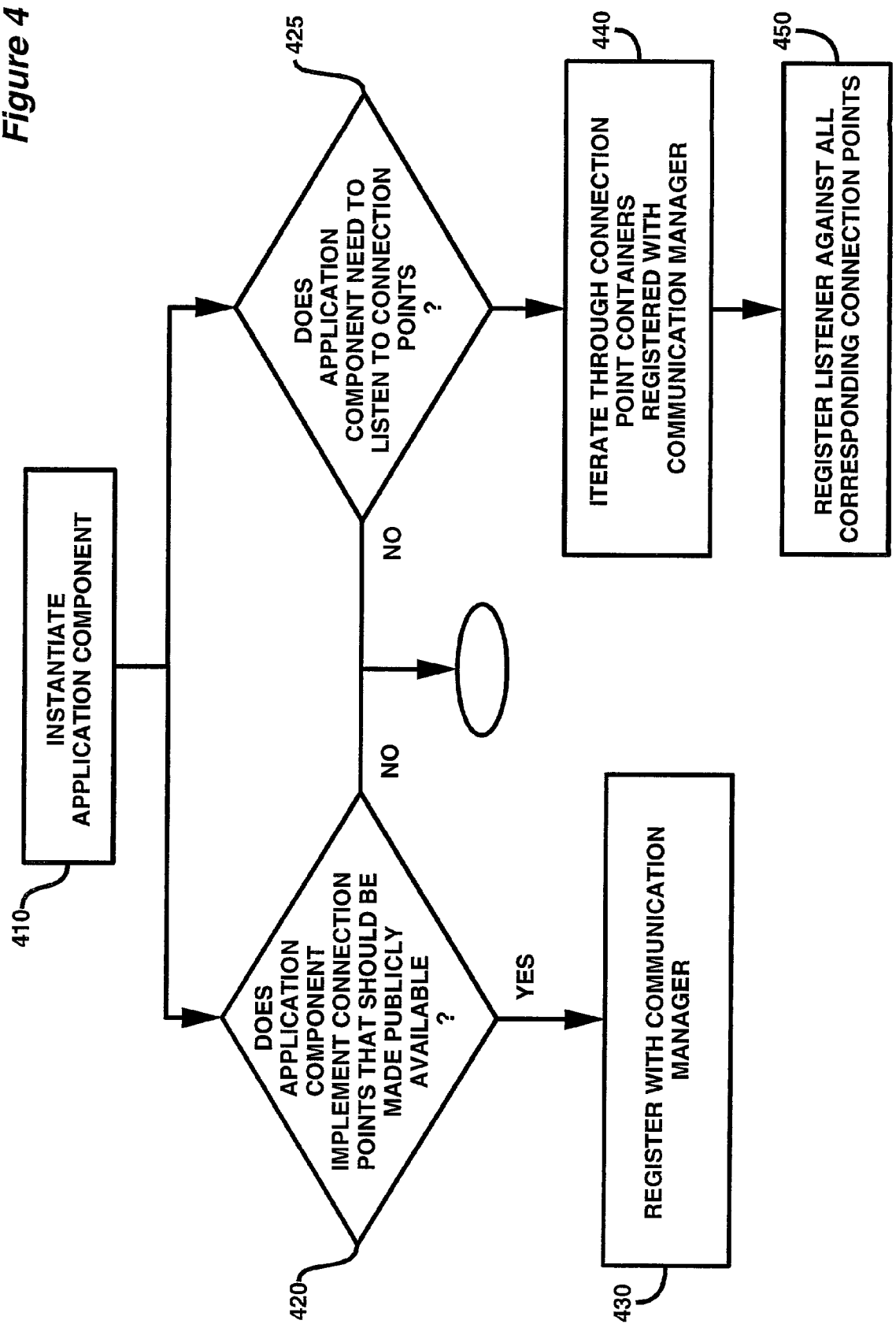
FIG. 4 is a flowchart illustrating the steps involved in the method for establishing communication links between application components in an embodiment of the invention.

FIG. 4 is a flowchart illustrating the steps involved in the method for establishing communication links between application components in an embodiment of the invention. An application component is instantiated at step 410. A test is performed at step 420 to check whether the application component implements connection point objects that should be made available to other application components. If so, the connection point container is registered with the communication manager at step 430.

After the application component is instantiated another test is performed at step 425 to check whether the application component implements one or more listeners to listen for specific event type. If the application component has one or more listeners a look up for connection points implemented by other application components is performed at step 440. In embodiments of the invention, the communication manager broadcasts registration events through its connection points. Since most listeners register using a helper that registers itself against the communication manager and listens for registration and de-registration events, the event broadcasting results in traversing all listeners registered with the communication manager. The process of searching for connection points involves iterating through the connection point containers registered with the communication manager. At step 450, each listener is then registered against the corresponding connection points provided by other application components.

Figure 5:
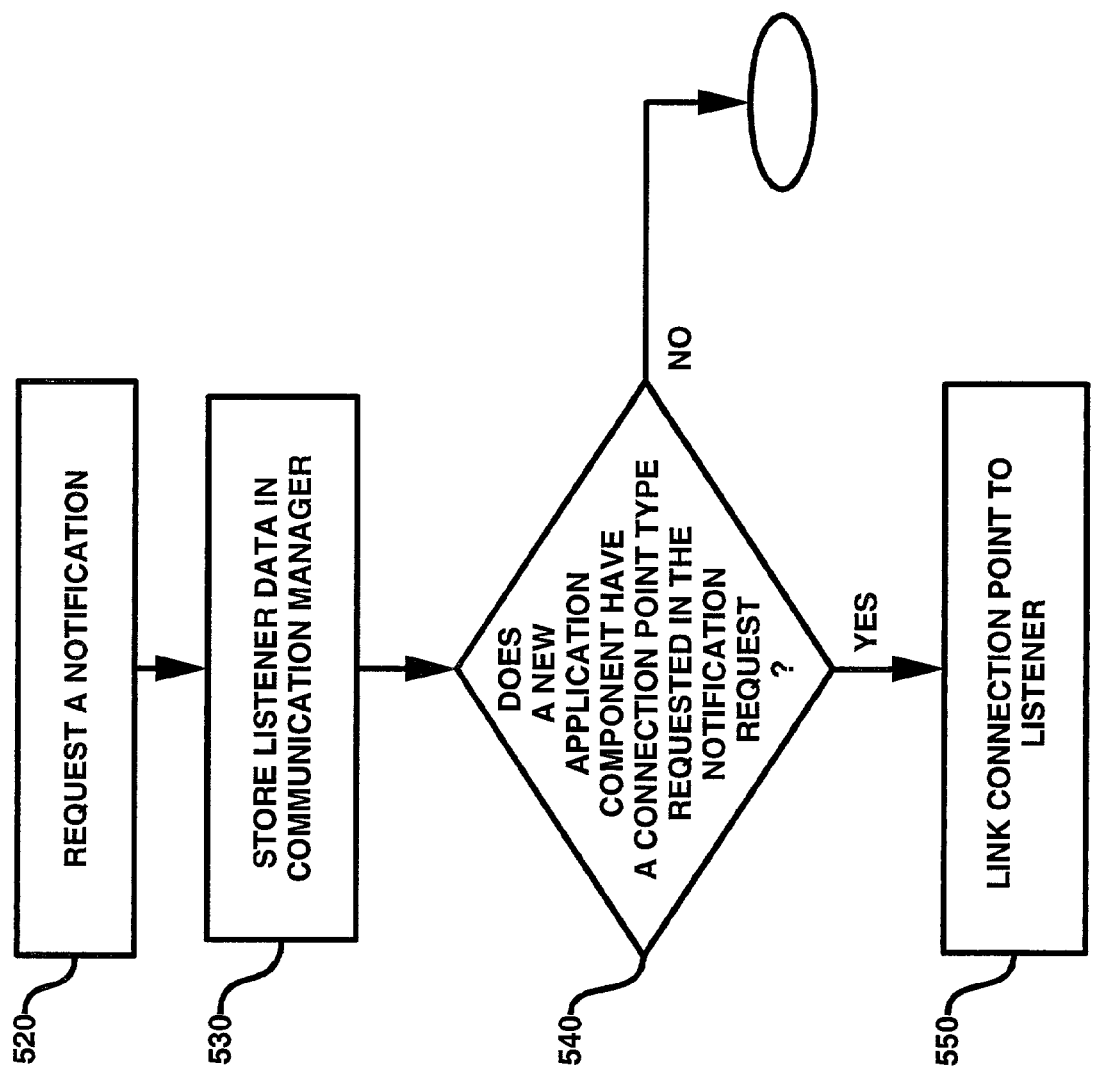
FIG. 5 is a flowchart illustrating the steps involved in the method for discovery in an embodiment of the invention.

FIG. 5 is a flowchart illustrating the steps involved in the method for discovery in an embodiment of the invention. The invention provides a mechanism where an application component may register with the communication manager and request a notification for one or more types of connection points from application components that register subsequently. An application component requests a notification at the time of the registration with the communication manager at step 520. The communication manager stores the listeners' data (e.g. application component information and methods to call for notification) at step 530. When new components register with the communication manager, a test is performed, at step 540, to check whether the newly registered component has a connection point type that is requested by the requesting component. If the newly registered component has a connection point type requested by the application component, the communication manager establishes a link between the connection point and the listener.

Figure 6B:
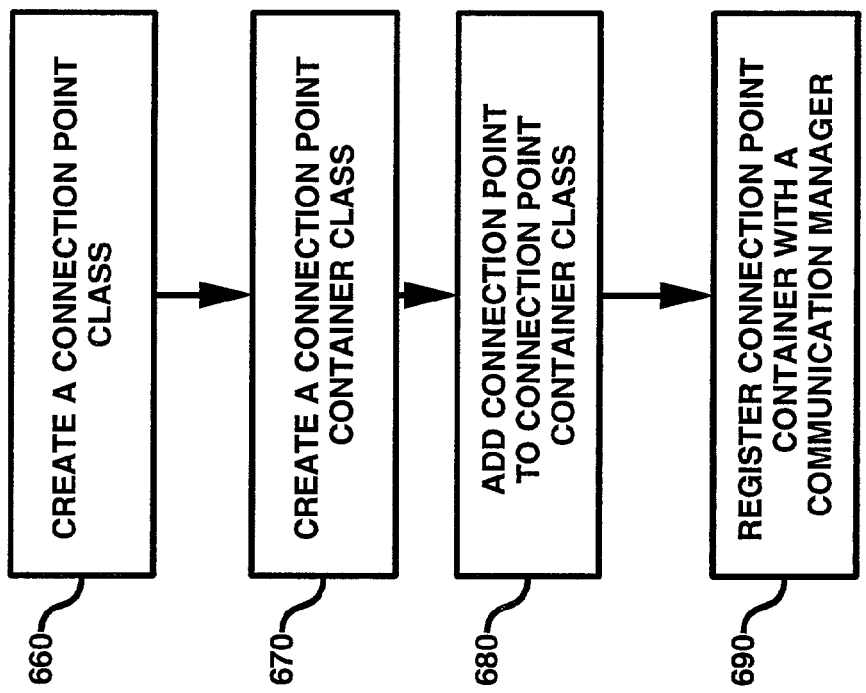
FIGS. 6a and 6b are flow charts illustrating the steps involved in developing an application component that supports connection points (steps 610 through 650) and the steps of running an application components that implements connection points (steps 660 through 690), respectively, in embodiments of the invention.
Figure 6A:
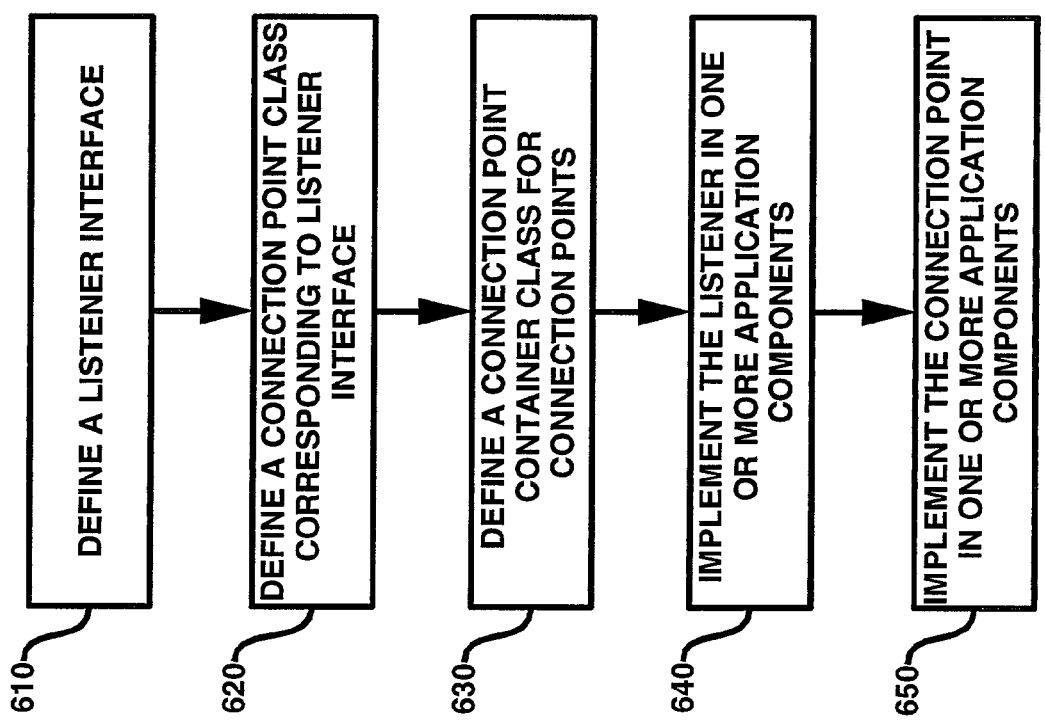

FIGS. 6a and 6b are flow charts illustrating the steps involved in developing an application component that supports connection points (steps 610 through 650) and the steps of running application components that implement connection points (steps 660 through 690), respectively, in embodiments of the invention. Typically, a developer of an embodiment of the invention creates one or more listener interfaces at step 610. The listener interfaces define the type of event an application component will be designed to handle. The developer of an embodiment of the invention may then create one or more connection points, at step 620, that correspond to the listener interfaces created at step 610. At step 630, the developer defines a connection point container. During the process of developing an application, the listener classes are implemented in one or more application components, at step 640, enabling the application to handle specific event information. Application components may also implement connection point classes, at step 650. The connection point classes enable the Application components to broadcast events and messages to other application components.

In an embodiment of the invention, at runtime the instantiation of an application component results in creating a connection point, at step 660, for each connection point implement by the application component. A connection point container is created, at step 670. All connection points of an application component destined to be publicly available to other application components are added to the connection point container at step 680. After the application component has been instantiated, the application component registers with the communication manager, at step 690, by submitting the connection point container to the communication manager.

Figure 7:
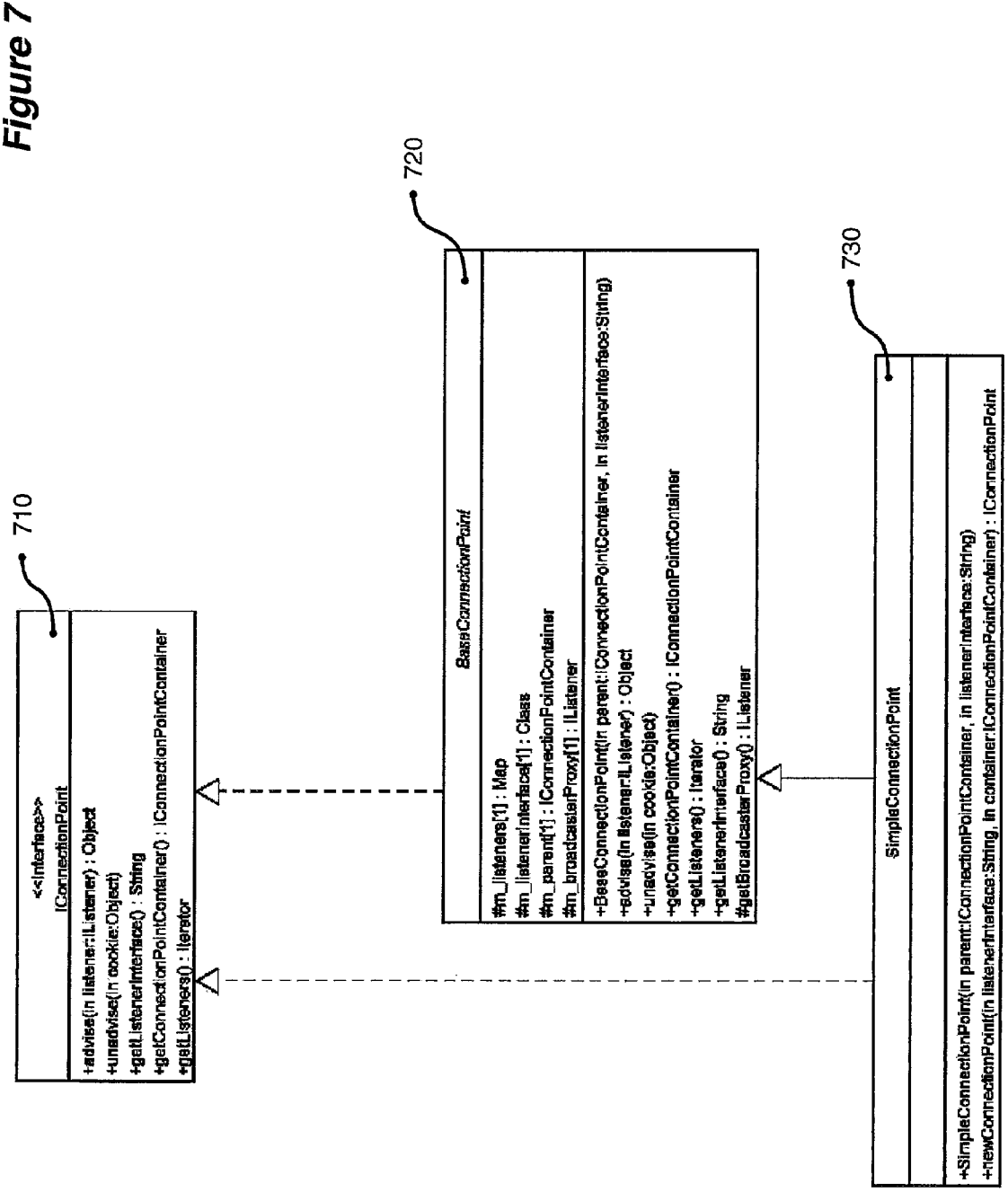
FIG. 7 is a unified modeling language representation of the base classes for constructing connection points in an embodiment of the invention.

FIG. 7 is a unified modeling language representation of the base classes for constructing connection points in an embodiment of the invention. The IConnectionPoint interface supports connection points for connectable objects. Object 710 (IConnectionPoint) is an interface that provides the ability to connect and disconnect sinks to application components. It also provides the ability to enumerate the connections that exist for the interface. The base interface class 710 provides the basic methods for enabling access to connection point types (e.g. advise method) and mutators (e.g. getConnectionPointContainer and getListener) for returning listeners and connection point containers associated with a connection point.

A base class (e.g. 720) is constructed by implementing the connection point interfaces and extending the set of functionality to allow an application component to communicate with other application components (e.g. broadcast events and messages) on their corresponding listeners. A connection point such as SimpleConnectionPoint 730 can then be created by deriving a class from the base connection point class. Embodiments of the invention, implement one or more connection point types by deriving objects from the base connection point class and adding any extra functionality as desired by the application developer.

Figure 8:
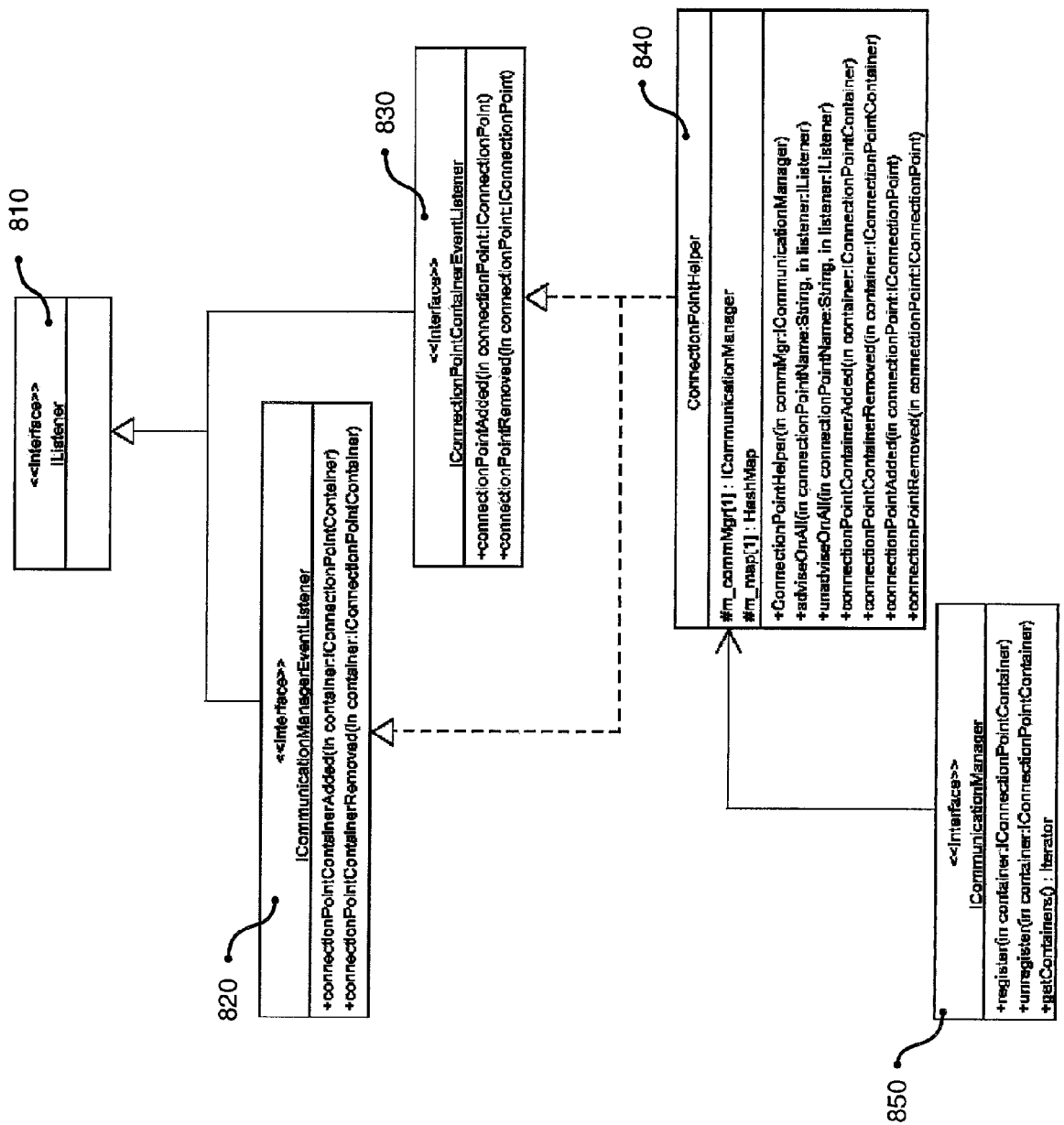
FIG. 8 is a Unified Modeling Language representation of the base classes for constructing listener interfaces in an embodiment of the invention.

FIG. 8 is a Unified Modeling Language representation of the base classes for constructing listener interfaces in an embodiment of the invention. A simple interface object 810 (IListener) is used to declare any object implementing IListener to be identified as a listener. The communication manager is enabled to listen to various events broadcasted from connection points. In an embodiment of the invention a listener interface 820 (ICommunicationManagerEventListener) is constructed for implementation by the communication manager. The ICommunicationManagerEventListener Listener interface is implemented by any object listening on the CommunicationManagerEvent connection point. ICommunicationManagerEventListener is enabled to add and remove connection point containers through two methods: connectionPointContainerAdded and connectionPointContainerRemoved.

The connection point container class described above is also made to listen to events broadcasted by connection points through an interface 830 (IConnectionPointContainerEventListener) constructed by inheriting the IListener interface. An embodiment of the invention uses a Connection point helper class (e.g. 480) to provide an interface containing methods for adding and removing connection point containers. The connection point helper also provides methods for enumerating connection containers and serving a list of registered connection point containers (e.g., AdviseOnAll method).

Embodiments of the invention use an interface object 850 (ICommunicationManager), which is associated with the Connection Point Helper class and thus is enabled with all the properties and methods implemented for event listeners.

The ICommunicationManager interface further provides support for registering and un-registering connection point containers.

Figure 9:
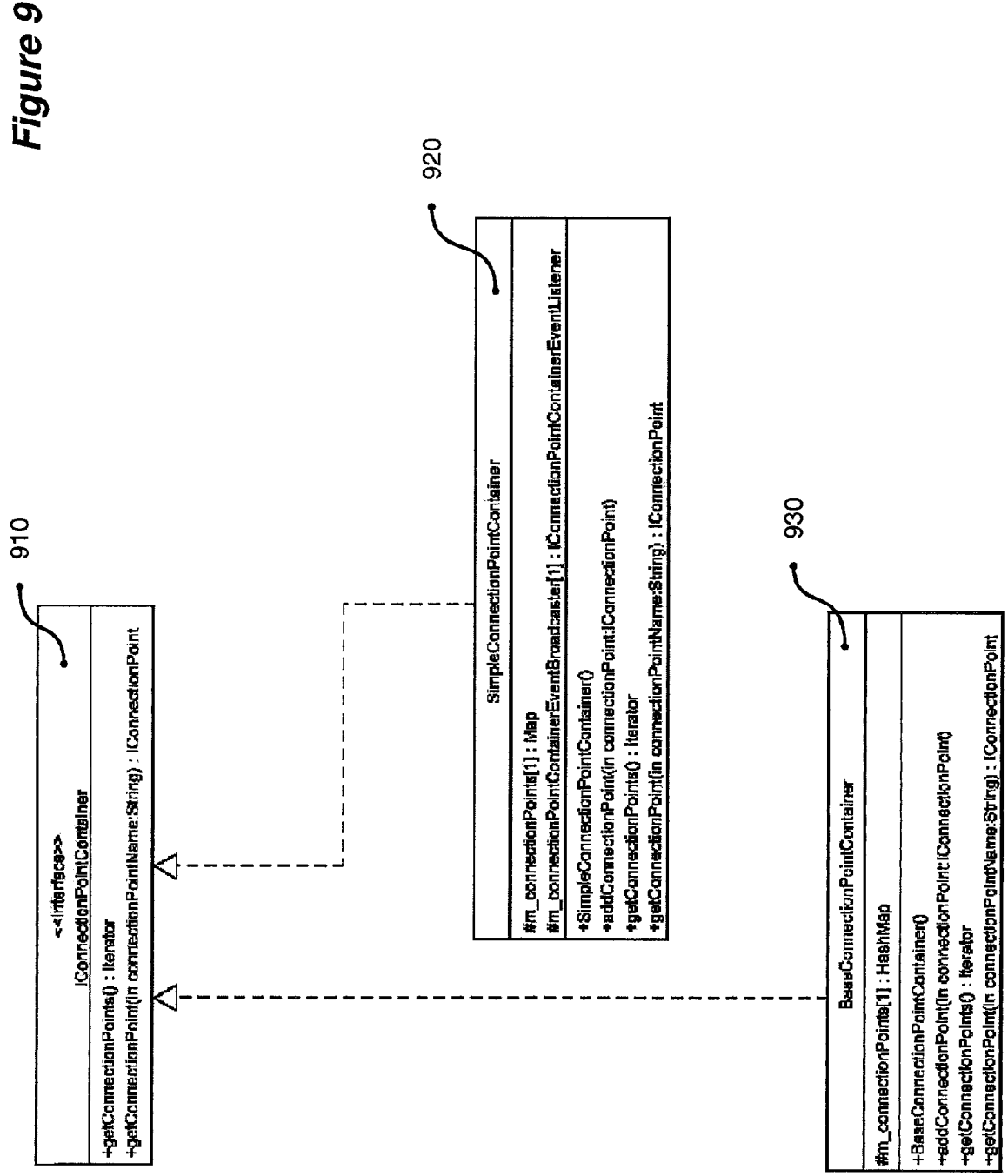
FIG. 9 is a Unified Modeling Language representation of the base classes for constructing containers for connection points in an embodiment of the invention.

FIG. 9 is a Unified Modeling Language representation of the base classes for constructing containers for connection points in an embodiment of the invention. Interface class 910 (IConnectionPointContainer) defines an interface for objects enabled to contain connection points. IConnectionPointContainer defines a container interface of IConnectionPoints. The interface provides a means for enumerating possible connection points, and retrieving specific connections points. Interface class 920 (SimpleConnectionPointContainer) is a simple class that implements the connection point container interfaces and provides a mechanism for enumerating, adding and removing connection points to the container. Interface object 920 (BaseConnectionPointContainer) is also derived from the connection point container class. It provides a process for adding and removing connection points. In one or more embodiments of the invention, connection point containers can be derived by extending BaseConnectionPointContainer.

Figure 10A:
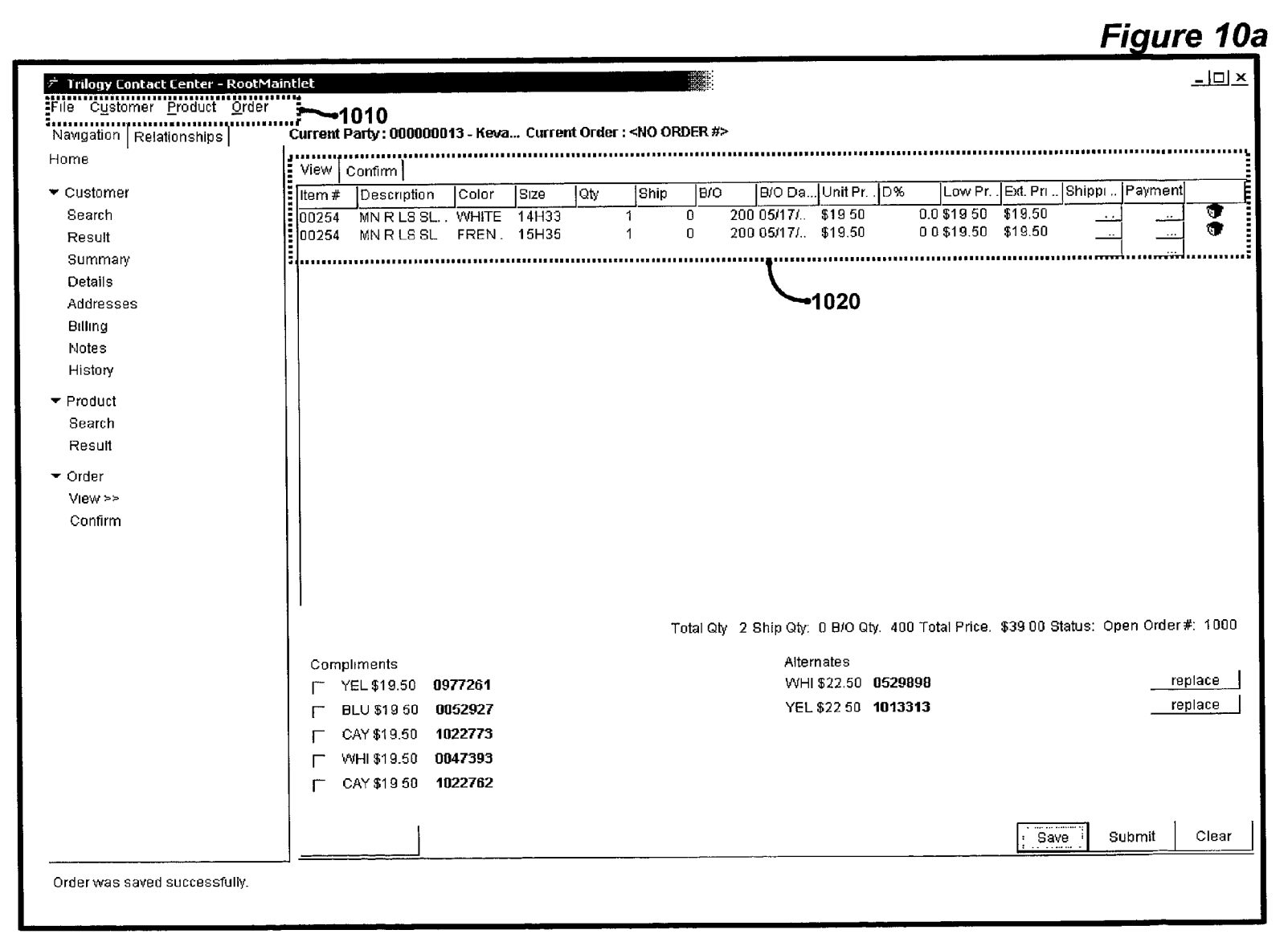

FIG. 10a is a block diagram illustrating an application implementing an embodiment of the invention. In this example an application is built using a compound panel, and one or more application components. Application components (e.g., 1010 and 1020) implement connection points, connection point containers and listeners in accordance with an embodiment of the invention. For example, component 1010 displays a menu of items from which a user may select to run a process. That process may require retrieving data for a set of items and displaying them in a window. Application component 1020 may be specialized for listing data in a window. In this example, application component 1020 implements a listener, in coordination to an embodiment of the invention, that receives a user event from the menu application component and handles data retrieval and display. The user may then interact with application component 1020 (e.g., by double-clicking a mouse button while positioned over a row in the displayed list).

FIG. 10b is a block diagram illustrating user interaction with an application implementing an embodiment of the invention. As in FIG. 10a the application is built using compound application components. The application components implement connection points, connection point containers and listeners in accordance with an embodiment of the invention. In this example, component 1040 specializes in displaying detailed information of a selected item from component 1010. Typically, a user highlights an item from the list handled by application component 1010, and issues a command to view the details of the data concerning that item for example by double-clicking a mouse button, or by typing a key or a combination of keys on the keyboard. Application component 1010 receives the user's input and broadcast the command as an event to application component 1040, which has a listener for receiving that particular type of user commands. Application component 1040 then determines which list item was chosen, and retrieve the data related to the item and displays it.

In an embodiment of the invention, three classes are written by the end user to use connection points: a listener interface that defines the signature of methods; a connection point container that broadcasts messages; and a connection point on which messages are broadcast. It is responsible for maintaining the list of listeners and for forwarding messages on to all listeners.

In another embodiment of the invention, a base class is introduced. The base class simplifies the connection point class. The base class handles all the basic connection point functions, such as registering and un-registering connection points. The base connection point class uses a proxy class (as defined in the JAVA programming language specification version 1.3) to handle forwarding messages to all listeners. The base connection point class uses a proxy that implements the listener interface, and handles forwarding all messages to all listeners. Then, a subclass such an application component, simply needs to associate with the proxy class and instruct it to notify all listeners.

In other embodiments of the invention, a proxy class is introduced. It allows for eliminating the need for an explicit call of the connection point class. A simple Connection Point class is provided with a static method for creating the proxy class. This proxy implements both the connection point interface and the listener interface. Connection point methods are then forwarded on to the implementation in the base Connection Point class, while all listener interface methods are forwarded on to the broadcast proxy class.

An embodiment of the invention solves the problem of communication in an application (e.g., the Contact Center Application which is described herein for example) by using compound application components. Within the compound application component framework, application components can be added and removed, and application components must be able to function properly without knowing what other application components are in the system. An example of this in the Contact Center Application is the Status Bar application component. In FIGS. 10a and 10b, the application displays data after an item has been selected from the list. A status bar at the bottom of the application displays an appropriate status message. However, an embodiment of the invention allows a developer to build application components that do not know about each other, or communicate directly with each other. Instead, the components communicate through a Status Bar connection point. FIG. 2 displays how the Order application component is a connection point container that contains the Status Bar connection point, and how the Status Bar application component listens to this connection point.

Embodiments of the invention have the ability to add a new application component (for example an Order History application component) to the application that needs to broadcast status messages. An application developer needs only to have the application component to implement a connection point container for the status bar connection point. The status bar application component does not need to know about the new application component, and the new application component does not need to know about the status bar application component.

An embodiment of the invention also improves the ease of introducing alterations to applications. For example, a developer may use a different type of status bar, for example one that pops up the status message instead of displaying it on the bottom of the screen. The two types of status bar application components may be swapped out. Because none of the application components knows directly about which other application components it is communicating with, the application components still operate appropriately.

A second example of connection points in the Contact Center Application is in the customer management section of the application. Whenever the current customer is selected (either through searching the customer database or through creating a new customer), all the customer management application components must have access to the current selected customer. In this example, Connection points are used to make this integration seamless. The Party Module communicates with the server, and maintains the current customer. To communicate changes to the current customer, it communicates through a Party Module connection point. Therefore, whenever a new customer application component is added to the application, it operates seamlessly with the rest of the application.

Thus, a method and apparatus for supporting connection points has been described. The invention however, is defined by the claims and the full scope of any equivalents.

What is claimed is:

1. In a computer system, a method for implementing an inter-component communication mechanism comprising:
    registering a container of connection points of an application with a communication manager upon instantiation of the application;
    storing a registration map in the communication manager of registered containers of connection points; and
    upon instantiation of the application, determining by the communication manager if the instantiated application includes one or more listeners; and
    if the communication manager determines that the instantiated application includes one or more listeners:
        searching through the registration map for at least one connection point having a given connection point type; and
        connecting at least one listener of the instantiated application having the given connection point type with the at least one connection point resulting from the searching.

2. The method in claim 1 wherein the container of connection points further comprises a list of the at least one connection point.

3. The method in claim 1 wherein the container of connection points further comprises a map enumerating the at least one connection point.

4. The method in claim 1 wherein the communication manager further comprises methods for adding and removing the container of connection points.

5. The method in claim 1 wherein the registration map further comprises a map for storing data for the container of connection points.

6. The method in claim 1 wherein the searching through the registration map further comprises requesting an advise on the connection point containers.

7. The method in claim 1 wherein the searching through the registration map further comprises inspecting the connection point type.

8. The method of claim 1 wherein said intercomponent communication mechanism is configured for use in a contact center application.

9. In a computer system, a method for implementing an inter-component communication mechanism comprising:
    registering a first component with a communication manager;
    issuing a request to the communication manager by the first component to be notified of other registrations;
    instantiating a second application component;
    receiving a registration request from the second application component;
    broadcasting the request to the first application component;
    linking an event listener of the first application component with a connection point of the second application component; and
    upon instantiation of the second application component, determining by the communication manager if the instantiated application includes one or more listeners; and
    if the communication manager determines that the instantiated application includes one or more listeners:
        searching through the registration map for at least one connection point having a given connection point type; and
        connecting at least one listener of the instantiated second application component having the given connection point type with the at least one connection point resulting from the searching.

10. The method in claim 9 wherein the issuing a request to the communication manager by the first component to be notified of other registrations further comprises using a communication manager helper.

11. The method in claim 10 wherein the communication manager helper further comprises methods for enumerating a list of connection points.

12. The method in claim 10 wherein the communication manager helper further comprises methods for adding and removing connection points.

13. The method in claim 9 wherein the broadcasting the request to the first application component further comprises causing a connection point to invoke a method in a listener of a connection point container of the second application component.

14. The method in claim 9 wherein the linking an event listener of the first application component with a connection point of the second application component further comprises inspecting the connection point type.

15. In a computer system, a method for developing a computer application enabled with a mechanism for inter-component communication comprising:
    implementing a listener interface in at least two application components;
    implementing a connection point class in at least one application component, wherein the connection point class implementing a connection point interface is enabled to broadcast messages to a plurality of listeners implementing the listener interface;
    implementing a communication manager component comprising a registration map;
    obtaining a connection point container containing the at least one connection point class;
    implementing a plurality of methods in the connection point to communicate with the plurality of listeners; and
    implementing in the communication manager one or more methods that upon instantiation of an application component:
        determines if the instantiated application includes one or more listeners; and
        if the one or methods of the communication manager determines that the instantiated application includes one or more listeners:
            searches through the registration map for at least one connection point having a given connection point type; and
            connects at least one listener of the instantiated application component having the given connection point type with the at least one connection point resulting from the searching.

16. The method in claim 15 wherein the implementing a listener interface in at least two components further comprises developing at least one JAVA class.

17. The method in claim 15 wherein the obtaining a connection point container further comprises developing methods for adding and removing connection points to the connection point container.

18. The method in claim 15 wherein the implementing a plurality of methods further comprises implementing methods for advising other connection points.

19. The method in claim 15 wherein the implementing a plurality of methods further comprises implementing methods for broadcasting messages through the connection points.

20. A computer program product comprising:
a computer usable medium for implementing an inter-component communication, the computer usable medium comprising computer readable program code configured to:
register a container of connection points with a communication manager, wherein the container is implemented by an instantiated application;
store a registration map in the communication manager of registered containers of connection points;
upon instantiation of the application, determine by the communication manager if the instantiated application includes one or more listeners; and
if the communication manager determines that the instantiated application includes one or more listeners:
search through the registration map for any connection point having a given connection point type; and
connect at least one listener of the instantiated application having the given connection point type with the any connection point resulting from the searching.

21. The computer program product of claim 20 wherein the container of connection points further comprises a list of the connection points.

22. The computer program product of claim 20 wherein the container of connection points further comprises a hash table enumerating the connection points.

23. The computer program product of claim 20 wherein the communication manager further comprises methods for adding and removing connection point containers.

24. The computer program product of claim 20 wherein the registration map further comprises a hash table for storing data for the connection point container.

25. The computer program product of claim 20 wherein the searching through the registration map further comprises requesting an advice on connection point containers.

26. The computer program product in claim 20 wherein the searching through the registration map further comprises inspecting the connection point type.

27. A computer program product comprising:
a computer usable medium for implementing an inter-component communication, the computer usable medium comprising computer readable program code configured to:
register a first component with a communication manager;
issue a request to the communication manager by the first component to be notified of other registrations;
receive a registration request from a second application component;
broadcast the request to the first application component;
link an event listener of the first application component with a connection point of the second application component; and
upon instantiation of the application, determining by the communication manager if the instantiated application includes one or more listeners; and
if the communication manager determines that the instantiated application includes one or more listeners:
searching through the registration map for at least one connection point having a given connection point type; and
connecting at least one listener of the instantiated second application component having the given connection point type with the at least one connection point resulting from the searching.

28. The computer program product of claim 27 wherein the issuing a request to the communication manager by the first component to be notified of other registrations further comprises using a communication manager helper.

29. The computer program product of claim 28 wherein the communication manager helper further comprises methods for enumerating a list of connection points.

30. The computer program product of claim 28 wherein the communication manager helper further comprises methods for adding and removing connection points.

31. The computer program product of claim 27 wherein the broadcasting the request to the first application component further comprises causing a connection point to invoke a method in a listener of a connection point container of the second application component.

32. The computer program product of claim 28 wherein the linking an event listener of the first application component with a connection point of the second application component further comprises inspecting the connection point type.

33. A system for implementing an inter-component communication mechanism comprising:
a means for registering a container of connection points of an application with a communication manager upon instantiation of the application;
a means for storing a registration map in the communication manager of registered containers of connection points;
a communication manager for determining, upon instantiation of the application, if the instantiated application includes one or more listeners;
a means for searching through the registration map for at least one connection point having a given connection point type upon instantiation of the application if the instantiated application includes one or more listeners; and
a means for connecting at least one listener of the instantiated application having the given connection point type with the at least one connection point resulting from the searching upon instantiation of the application if the instantiated application includes one or more listeners.

34. In a network system having a plurality of computers, a method for implementing an inter-component communication mechanism between each of the plurality of computers comprising:
registering a container of connection points of an application with a communication manager upon instantiation of the application;
storing a registration map in the communication manager of registered containers of connection points; and upon instantiation of the application, determining by the communication manager if the instantiated application includes one or more listeners; and if the communication manager determines that the instantiated application includes one or more listeners:
  searching through the registration map for at least one connection point having a given connection point type; and
  connecting at least one listener of the instantiated application having the given connection point type with the at least one connection point resulting from the searching.

35. An apparatus configured to implement a connection point mechanism to communication between a plurality of components in a Graphical User Interface (GUI) comprising:
  a processor;
  a memory medium coupled to said processor, said memory medium comprising a module configured to manage the components of a Graphical User Interface, the module comprising:
    a first element configured to register a container of connection points of an application with a communication manager upon instantiation of the application
  a second element configured to store a registration map in the communication manager of registered containers of connection points;
  a third element to determine, upon instantiation of the application, if the instantiated application includes one or more listeners;
  a fourth element configured to search through the registration map for at least one connection point having a given connection point type upon instantiation of the application if the instantiated application includes one or more listeners; and
  a fifth element configured to connect at least one listener of the instantiated application having the given connection point type with the at least one connection point resulting from the searching upon instantiation of the application if the instantiated application includes one or more listeners.

36. The apparatus of claim 35 wherein said module comprises computer readable program code implemented in at least one computer system.

37. The apparatus of claim 36 wherein said at least one computer readable program code comprises a contact center application.

38. An apparatus configured to implement a connection point mechanism to communication between a plurality of components in a Graphical User Interface (GUI) comprising:
  a processor;
  a memory medium coupled to said processor, said memory medium comprising a module configured to manage the components of a Graphical User Interface, the module comprising:
    a first element configured to register a first component with a communication manager;
    a second element configured to issue a request to the communication manager by the first component to be notified of other registrations;
    a third element configured to receive a registration request from a second application component;
    a fourth element configured to broadcast the request to the first application component;
    a fifth element configured to link an event listener of the first application component with a connection point of the second application component;
    a sixth element to determine, upon instantiation of the second application, if the instantiated second application includes one or more listeners;
    a seventh element configured to search through the registration map for at least one connection point having a given connection point type upon instantiation of the second application if the instantiated second application includes one or more listeners; and
    an eighth element configured to connect at least one listener of the instantiated second application having the given connection point type with the at least one connection point resulting from the searching upon instantiation of the application if the instantiated application includes one or more listeners.

39. The apparatus of claim 38 wherein said first component and said second application component comprise interface components for a contact center application.

* * * * *